Nov. 11, 1958  J. HOCHREUTER  2,859,598
LUBRICATING DEVICE FOR THE POWER TRANSMISSION
BOLT OF ELASTIC SHAFT COUPLINGS
Filed May 21, 1957  2 Sheets-Sheet 1

INVENTOR.
Johann Hochreuter
BY Ernest F. Montague
Attorney

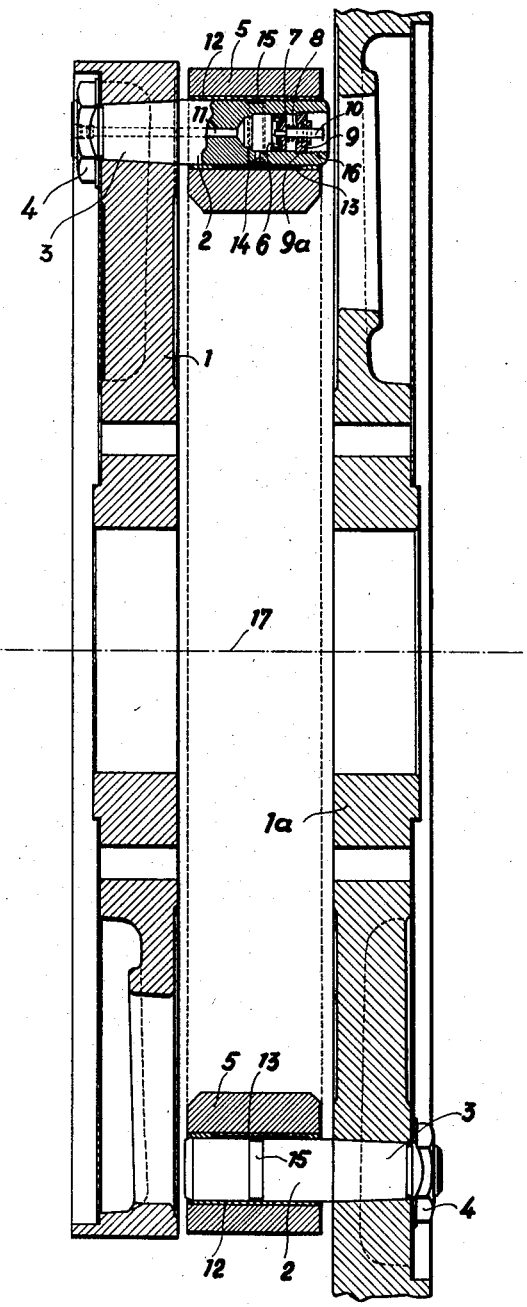

United States Patent Office 2,859,598
Patented Nov. 11, 1958

2,859,598

LUBRICATING DEVICE FOR THE POWER TRANSMISSION BOLT OF ELASTIC SHAFT COUPLINGS

Johann Hochreuter, Ansbach, Mittelfranken, Germany

Application May 21, 1957, Serial No. 660,524

2 Claims. (Cl. 64—10)

The present invention relates to a lubricating device for the power transmission bolts of elastic shaft couplings.

The power transmission bolts of elastic shaft couplings were not lubricated heretofore. On the power transmission bolts of both coupling parts of known shaft couplings, segments or sleeves are turnably mounted, which transfer the power by means of metallic or non-metallic spring-elements to corresponding segments or sleeves of the other coupling part. By turning the two coupling parts relative to each other power transferring segments or sleeves turn on their power transmission bolts. Even if the turning angle is comparatively small, it is advisable to lubricate the bolts and the main pressure faces, particularly if impulsive driving conditions prevail and the couplings are to be run over a long time period without attendance.

It is, therefore, one object of the present invention to provide a lubricating device for the power transmission bolts which carry the segments or sleeves, and which lubricating device feeds the lubricant by means of a spring biased pressure piston against the centrifugal force caused by the rotation of the elastic shaft coupling to the carrying face of the bolt, which is disposed in the direction of or towards the axle of the shaft coupling. By this arrangement the carrying faces subjected to the highest pressure are lubricated.

It is another object of the present invention to provide a lubricating device for the power transmission bolts wherein the latter have a chamber receiving the lubricant and a spring biased pressure member. Furthermore, the bolt has an axially disposed, inner filling channel for the lubricant, the filling channel being adapted to permit continuous refilling of the chamber with lubricant. Finally, the bolt has a radially disposed lubricating channel which is directed towards the axle of the shaft coupling, which lubricating channel communicates with a distribution groove disposed in the main pressure zone of the bolt and with a ring channel arranged around the bolt.

With these and other objects in view which will become apparent in the following detailed description, the present invention will be clearly understood in connection with the accompanying drawing, in which:

Fig. 2 is an axial section of an elastic shaft coupling.

Figure 1:
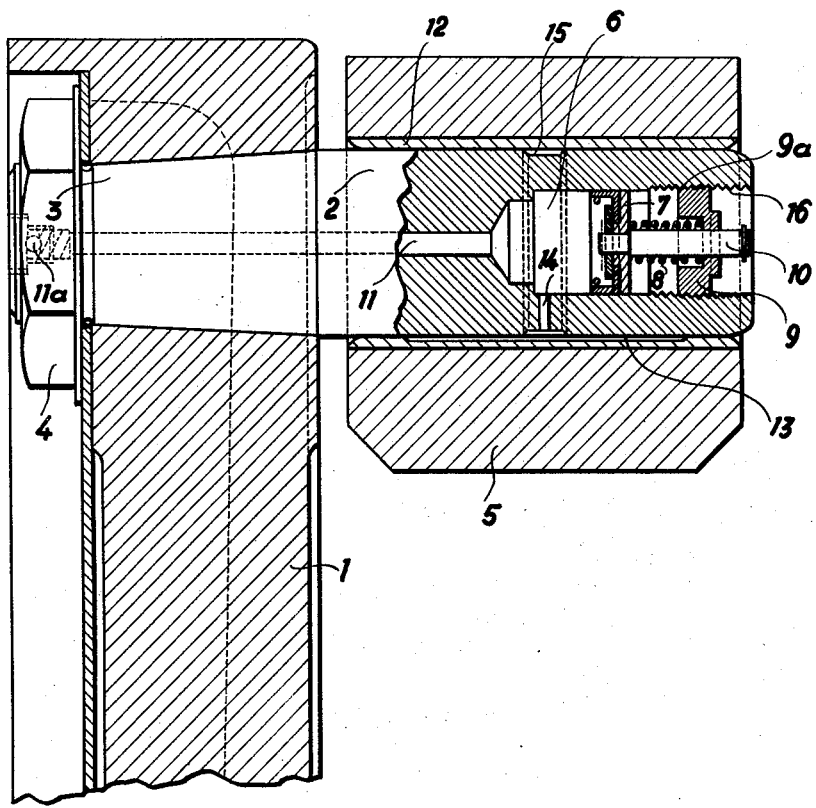
Figure 1 is an axial section of the lubricating device.

Referring now to the drawings, the shaft coupling has a coupling disc 1. At the opposite side thereof (in Fig. 2 at the right side) a second corresponding coupling disc 1a is provided. Both coupling discs 1 and 1a have power transmission bolts 2 which are inserted into corresponding bores of the coupling discs 1 and 1a, respectively, by means of a cone 3 or by other suitable means and which bolts 2 are retained in operative position by means of nuts 4. The bolts 2 of the coupling discs are in known manner set off relative to each other in peripheral direction. Power transmission segments 5 or corresponding sleeves are rotatably mounted on the bolts 2. Inside of each of the bolts 2 is a cylindrical chamber 6 adapted to receive a lubricant. In the chamber 6 is disposed a pressure piston 7 which is under pressure of a spring 8 one end of which abuts a nut 9 having an outer thread 9a. The bolt 2 has a corresponding inner thread 16 which meshes with the outer thread 9a of the nut 9. By turning the nut 9, the latter may be moved in either axial direction, so that the pressure of the spring 8 may be adjusted. The piston 7 is guided in the nut 9 by means of the piston rod 10, whereby the nut 9 may be equipped advantageously with a marker to indicate the outermost position.

Each of the power transmission bolts 2 has further an axially disposed filling channel 11, which is closed up by means of a pressure ball 11a or by other suitable means. The chamber 6 may be refilled with lubricant through the filling channel 11. A lubricating channel 14 leads from the chamber 6 radially in the direction towards the axle 17 of the shaft coupling (Fig. 2). A carrying sleeve 12 is provided for mounting the power transmission segment 5. The lubricating channel 14 communicates with a ring channel 15 disposed around the bolt 2 which in turn is connected with a distributor groove 13.

The present device operates in the following manner:

The lubricant is fed through the filler channel 11 into the chamber 6 under pressure or by injection. The lubricant is in the chamber 6 under pressure by means of the piston 7 biased by the spring 8. The lubricant is then fed through the radial channel 14 against the centrifugal force of the rotating shaft coupling into the ring channel 15 and then into the distributor groove 13.

While I have disclosed one embodiment of the present invention, it is to be understood that this embodiment is given by example only and not in a limiting sense, the scope of the present invention being determined by the objects and the claims.

I claim:

1. A lubricating device for the power transmission bolts of elastic shaft couplings comprising two coupling discs, power transmission bolts secured to said coupling discs, a segment rotatably mounted on each of said bolts, the latter having a lubricant receiving chamber, a spring biased piston axially movable in said chamber for feeding said lubricant from said chamber in a direction opposite to the centrifugal force towards the carrying face of said bolts facing an axle of said shaft couplings.

2. The lubricating device, as set forth in claim 1, wherein said bolts have an axially disposed filler channel leading from one end of said bolt into said chamber and a radially disposed feeding channel directed towards said axle of said shaft coupling, as well as a ring channel disposed around said bolts communicating with said feeding channel, and a distributor groove communicating with said ring channel and arranged in the main pressure zone of said bolts.

References Cited in the file of this patent

UNITED STATES PATENTS

| | | |
|---|---|---|
| 1,453,700 | Busse | May 1, 1923 |
| 1,654,586 | Goldsmith | Jan. 3, 1928 |
| 1,945,512 | Bijur | Feb. 6, 1934 |
| 2,727,369 | Fawick | Dec. 20, 1955 |

FOREIGN PATENTS

| | | |
|---|---|---|
| 159,226 | Australia | Oct. 7, 1954 |